US007546173B2

(12) United States Patent
Waserblat et al.

(10) Patent No.: US 7,546,173 B2
(45) Date of Patent: Jun. 9, 2009

(54) APPARATUS AND METHOD FOR AUDIO CONTENT ANALYSIS, MARKING AND SUMMING

(75) Inventors: Moshe Waserblat, Modein (IL); Gili Aharoni, Ramat Hasharon (IL); Aviv Bachar, Cresskill, NJ (US); Barak Eliam, Hod Hasharon (IL); Ilan Freedman, Petach Tiqwa (IL)

(73) Assignee: Nice Systems, Ltd., Raanana (IL)

( * ) Notice: Subject to any disclaimer, the term of this patent is extended or adjusted under 35 U.S.C. 154(b) by 1117 days.

(21) Appl. No.: 10/481,438

(22) PCT Filed: Aug. 18, 2003

(86) PCT No.: PCT/IL03/00684

§ 371 (c)(1), (2), (4) Date: Dec. 17, 2003

(87) PCT Pub. No.: WO2005/018097

PCT Pub. Date: Feb. 24, 2005

(65) Prior Publication Data

US 2006/0133624 A1 Jun. 22, 2006

(51) Int. Cl.

*G10L 15/00* (2006.01)
*G10L 17/00* (2006.01)
*G10L 21/00* (2006.01)
*H04M 15/00* (2006.01)
*G06F 17/00* (2006.01)

(52) U.S. Cl. .................... 700/94; 379/133; 379/112.01; 704/201

(58) Field of Classification Search ............ 379/112.01, 379/133, 88.2; 381/119; 704/246, 201; 700/94
See application file for complete search history.

(56) References Cited

U.S. PATENT DOCUMENTS 3,991,268 A * 11/1976 Goodall ....................... 380/47
4,145,715 A 3/1979 Clever
4,527,151 A 7/1985 Byrne
4,821,118 A 4/1989 Lafreniere
5,051,827 A 9/1991 Fairhurst
5,091,780 A 2/1992 Pomerleau
5,303,045 A 4/1994 Richards et al.
5,307,170 A 4/1994 Itsumi et al.
5,353,168 A 10/1994 Crick (Continued)

FOREIGN PATENT DOCUMENTS

DE 10358333 7/2005

(Continued)

OTHER PUBLICATIONS

NiceVision—Secure your Vision, a prospect by NICE Systems, Ltd., (7 pages).

(Continued)

*Primary Examiner*—Curtis Kuntz
*Assistant Examiner*—Jesse A Elbin
(74) *Attorney, Agent, or Firm*—Ohlandt, Greeley, Ruggiero & Perle, L.L.P.

(57) ABSTRACT

An apparatus and method for the analysis, marking and summing of audio channel content and control data, the apparatus and method generating a summed signal carrying combined audio content, marking and summing data in the summed signal.

29 Claims, 7 Drawing Sheets

U.S. PATENT DOCUMENTS

| | | | | |
|---|---|---|---|---|
| 5,404,170 | A | 4/1995 | Keating | |
| 5,491,511 | A | 2/1996 | Odle | |
| 5,519,446 | A | 5/1996 | Lee | |
| 5,646,997 | A * | 7/1997 | Barton | 713/176 |
| 5,734,441 | A | 3/1998 | Kondo et al. | |
| 5,742,349 | A | 4/1998 | Choi et al. | |
| 5,751,346 | A | 5/1998 | Mitchell et al. | |
| 5,790,096 | A | 8/1998 | Hill, Jr. | |
| 5,796,439 | A | 8/1998 | Hewett et al. | |
| 5,847,755 | A | 12/1998 | Wixson et al. | |
| 5,895,453 | A | 4/1999 | Cook | |
| 5,920,338 | A | 7/1999 | Katz | |
| 6,014,647 | A | 1/2000 | Nizzar et al. | |
| 6,028,626 | A | 2/2000 | Aviv et al. | |
| 6,031,573 | A | 2/2000 | MacCormack et al. | |
| 6,037,991 | A | 3/2000 | Thro et al. | |
| 6,070,142 | A | 5/2000 | McDounough et al. | |
| 6,081,606 | A | 6/2000 | Hansen et al. | |
| 6,092,197 | A | 7/2000 | Coueignoux | |
| 6,094,227 | A | 7/2000 | Guimier | |
| 6,097,429 | A | 8/2000 | Seely et al. | |
| 6,111,610 | A | 8/2000 | Faroudja | |
| 6,134,530 | A | 10/2000 | Bunting et al. | |
| 6,138,139 | A | 10/2000 | Beck et al. | |
| 6,167,395 | A | 12/2000 | Beck et al. | |
| 6,170,011 | B1 | 1/2001 | Beck et al. | |
| 6,185,527 | B1 * | 2/2001 | Petkovic et al. | 704/231 |
| 6,212,178 | B1 | 4/2001 | Beck | |
| 6,230,197 | B1 | 5/2001 | Beck et al. | |
| 6,295,367 | B1 | 9/2001 | Crabtree et al. | |
| 6,327,343 | B1 | 12/2001 | Epstein et al. | |
| 6,330,025 | B1 | 12/2001 | Arazi et al. | |
| 6,345,305 | B1 | 2/2002 | Beck et al. | |
| 6,404,857 | B1 | 6/2002 | Blair et al. | |
| 6,411,687 | B1 * | 6/2002 | Bohacek et al. | 379/88.21 |
| 6,427,137 | B2 | 7/2002 | Petrushin | |
| 6,434,520 | B1 * | 8/2002 | Kanevsky et al. | 704/243 |
| 6,441,734 | B1 | 8/2002 | Gutta et al. | |
| 6,549,613 | B1 | 4/2003 | Dikmen | |
| 6,559,769 | B2 | 5/2003 | Anthony et al. | |
| 6,570,608 | B1 | 5/2003 | Tserng | |
| 6,604,108 | B1 | 8/2003 | Nitahara | |
| 6,628,835 | B1 | 9/2003 | Brill et al. | |
| 6,704,409 | B1 | 3/2004 | Dilip et al. | |
| 6,737,957 | B1 * | 5/2004 | Petrovic et al. | 340/5.86 |
| 7,076,427 | B2 | 7/2006 | Scarano et al. | |
| 7,103,806 | B1 | 9/2006 | Horvitz | |
| 2001/0040942 | A1 * | 11/2001 | Glowny et al. | 379/88.22 |
| 2001/0043697 | A1 | 11/2001 | Cox et al. | |
| 2001/0052081 | A1 | 12/2001 | McKibben et al. | |
| 2001/0053236 | A1 * | 12/2001 | Rhoads | 382/100 |
| 2002/0005898 | A1 | 1/2002 | Kawada et al. | |
| 2002/0010705 | A1 | 1/2002 | Park et al. | |
| 2002/0059283 | A1 | 5/2002 | Shapiro et al. | |
| 2002/0087385 | A1 | 7/2002 | Vincent | |
| 2003/0033266 | A1 * | 2/2003 | Schott et al. | 706/45 |
| 2003/0059016 | A1 | 3/2003 | Lieberman et al. | |
| 2003/0128099 | A1 | 7/2003 | Cockerham | |
| 2003/0163360 | A1 | 8/2003 | Galvin | |
| 2004/0098295 | A1 | 5/2004 | Sarlay et al. | |
| 2004/0117185 | A1 * | 6/2004 | Scarano et al. | 704/254 |
| 2004/0141508 | A1 | 7/2004 | Schoeneberger et al. | |
| 2004/0161133 | A1 | 8/2004 | Elazar et al. | |
| 2004/0215453 | A1 * | 10/2004 | Orbach | 704/231 |
| 2004/0249650 | A1 | 12/2004 | Freedman et al. | |
| 2005/0015286 | A1 * | 1/2005 | Rudnik et al. | 705/7 |
| 2006/0093135 | A1 | 5/2006 | Fiatal et al. | |

FOREIGN PATENT DOCUMENTS

| | | | |
|---|---|---|---|
| EP | 1 484 892 | | 8/2004 |
| GB | 9916430.3 | | 7/1999 |
| WO | WO 95/29470 | A | 11/1995 |
| WO | WO 98/01838 | A | 1/1998 |
| WO | WO 00/73996 | | 12/2000 |
| WO | WO 02/37856 | | 5/2002 |
| WO | WO 03/013113 | A2 | 2/2003 |
| WO | WO 03/067360 | A2 | 8/2003 |
| WO | WO 03/067884 | A1 | 8/2003 |
| WO | WO 04 091250 | | 10/2004 |

OTHER PUBLICATIONS

NICE Systems announces New Aviation Security Initiative, reprinted from Security Technology & Design, Dec. 2001 (1 page).

"The Camera That Never Sleeps", Yediot Aharonot (Hebrew), (Nov. 10, 2002) (1 page).

Closing the Contact Center Quality Loop with Customer Experience Management, Customer Interactions Solutions, vol. 19, No. 9, Mar. 2001, I. Freedman (2 pages).

PR Newswire, NICE Redefines Customer Interactions with Launch of Customer Experience Management, Jun. 13, 2000 (2 pages).

PR Newswire, Recognition Systems and Hyperion to Provide Closed Loop CRM Analytic Applications, Nov. 17, 1999 (2 page).

Financial companies want to turn regulatory burden into competitive advantage, Feb. 24, 2003, reprinted from Information Week, Ellen Colkin Cuneo (4 pages).

SEDOR—Internet pages from http://www.dallmeier-electronics.com (2 pages) SEDOR-self-learning event detector.

"The Computer at the Other End of the Line", Feb. 17, 2002; Print from Haaretz, (Hebrew) (2 pages).

A Data—Warehouse / OLAP Framework for Scalable Telecommunication Tandem Traffic Analysis—Qiming Chen, Meichun Hsu, Umesh Dayal—qchen,mhsu,dayal@hpl.com.

article SERTAINTY—Automated Quality Monitoring—SER Solutions, Inc.—21680 Ridgetop Circle Dulles, VA—WWW.ser.com.

article SERTAINTY—Agent Performance Optimization—2005 SE Solutions, Inc.

Lawrence P. Mark SER—White Paper—Sertainty Quality Assurance—2003—2005 SER Solutions Inc.

Douglas A. Reynolds Robust Text Independent Speaker Identification Using Gaussian Mixture Speaker Models—IEEE Transactions on Speech and Audio Processing, vol. 3, No. 1, Jan. 1995.

Chaudhari, Navratil, Ramaswamy, and Maes Very Large Population Text—Independent Speaker Identification Using Transformation Enhanced Multi-Grained Models—Upendra V. Chaudhari, Jiri Navratil, Ganesh N. Ramaswamy, and Stephane H. Maes—IBM T.j. Watson Research Centre—Oct. 2000.

Douglas A. Reynolds, Thomas F. Quatieri, Robert B. Dunn Speaker Verification Using Adapted Gaussian Mixture Models—Oct. 1, 2000.

Yaniv Zigel and Moshe Wasserblat—How to deal with multiple-targets in speaker identification systems?

A tutorial on text-independent speaker verification—Frederic Bimbot, Jean Bonastre, Corinn Fredouille, Guillaume Gravier, Ivan Chagnolleau, Sylvian Meigner, Teva Merlin, Javier Ortega Garcia, Dijana Deacretaz, Douglas Reynolds—Aug. 8, 2003.

Yeshwant K. Muthusamy et al—Reviewing Automatic Language Identification IEEE Signal Processing Magazine 33-41.

Marc A. Zissman—Comparison of Four Approaches to Automatic Language Identification of Telephone Speech IEEE Transactions on Speech and Audio Processing, vol. 4, 31-44.

Towards an Automatic Classification Of Emotions In Speech—N. Amir. S. Ron.

NiceVision—Secure your Vision, a prospect by NICE Systems, Ltd., (7 pages), 2002.

Financial companies want to turn regulatory burden into competitive advantage, Feb. 24, 2003, reprinted from Information Week, Ellen Colkin Cuneo (4 pages).

SEDOR—Internet pages from http://www.dallmeier-electronics.com (2 pages) SEDOR-self-learning event detector, May 2003.

A Data—Warehouse / OLAP Framework for Scalable Telecommunication Tandem Traffic Analysis—Qiming Chen, Meichun Hsu, Umesh Dayal—qchen,mhsu,dayal@hpl.com, 2000.

article SERTAINTY—Automated Quality Monitoring—SER Solutions, Inc.—21680 Ridgetop Circle Dulles, VA—WWW.ser.com, 2003.

Yaniv Zigel and Moshe Wasserblat—How to deal with multiple-targets in speaker identification systems? 2006.

Yeshwant K. Muthusamy et al—Reviewing Automatic Language Identification IEEE Signal Processing Magazine 33-41 Oct. 1994.

Marc A. Zissman—Comparison of Four Approaches to Automatic Language Identification of Telephone Speech IEEE Transactions on Speech and Audio Processing, vol. 4, 31-44, 1996.

Towards an Automatic Classification Of Emotions In Speech—N. Amir. S. Ron, 1998.

* cited by examiner

APPARATUS AND METHOD FOR AUDIO CONTENT ANALYSIS, MARKING AND SUMMING

This application is based on International Application No. PCT/IL03/00684, filed on Aug. 18, 2003, incorporated herein by reference.

FIELD OF THE INVENTION

The present invention generally relates to an apparatus and method for audio content analysis, summation and marking. More particularly, the present invention relates to an apparatus and method for a analyzing content of audio records, marking and summing the same into a single channel.

BACKGROUND OF THE INVENTION

Recordable audio interactions comprise typically two or more audio channels. Such audio channels are associated with one or more specific audio input devices, such as a microphone device, utilized for voice input by one or more participants in an audio interaction. In order to achieve optimal performance presently available content based audio extraction and analysis systems typically assume that the inputted audio signal is separated such that each audio signal contains the recording of a single audio channel only. However, in order to achieve storage efficiency, audio recording systems typically operate in a manner such that the audio signals generated by the separate channels constituting the audio interaction are summed and compressed into an integrated recording.

As a result, recording systems that provide content analysis components typically utilize an architecture that includes an additional logging device for separately recording the two or more separate audio signals received via two or more separate input channels of each audio interaction. The recorded interactions are then saved within a temporary storage space. Subsequently, a computer program, typically residing on a server, obtains the pair of audio signals of each recorded interaction from the storage unit and extracts audio-based content by running successively a required set of Automatic Speech Recognition (ASR) programs. The function of the ASR programs is to analyze speech in order to recognize specific speech elements and identify particular characteristics of a speaker, such as age, gender, emotional state, and the like. The content-based audio output is stored subsequently in a database for the purposes of retrieval and for subsequent specific data-mining applications.

FIG. 1 describes an audio content analysis apparatus 10, known in the art. Two or more separated but time synchronized audio channels 12 constituting an audio interaction are fed into an audio summing device 16. The audio summing device 16 is typically a Digital Signal Processor (DSP) device. The DSP device 16 sums the separated audio channels 12 into an integrated summed audio stream 20. The summed audio stream 20 is transferred via a specific signal transport path to an audio storage device 22. The device 22, which is typically a high-capacity hard disk, stores the audio stream 20 as a summed audio file 24. The same two or more separated audio channels 12 constituting the audio interaction are further fed into a dedicated temporary logging device 14. The logging device 14 is a hardware device having temporary audio storage capabilities. The logging device includes an audio recorder device 25 that separately records the two or more audio channels 12 and stores the separately recorded channels as a separated audio file 26. A content analysis server 34 pools, in accordance with pre-defined rules, the separated audio file 26 from the logging device 14 via a signal transport path 18 and processes the separated audio channels via the execution of a one or more specific audio content analysis routines. The results of the audio content analysis-specific processing 32 are stored in a content analysis database 30 and are made available for data mining applications. Subsequent to the analyzing the audio could be deleted from the logging device to provide for storage efficiency.

The above-described solution has several disadvantages. The additional logging device is typically implemented as a hardware unit. Thus, the installation and utilization of the logging device involve higher costs and increased complexity both in the installation, upkeep and upgrade of the system. Furthermore, the separate storage of the data received from the separate input devices, such as the microphones, involves increased storage space requirements. Typically, in the logging-device based configuration the execution of the content analysis by the content analysis server does not provide for real time alarm activation and for pre-defined responsive actions following the identification of pre-defined events.

Therefore, it would be easily perceived by one with ordinary skills in the art that there is a need for a new and advanced method and apparatus that would provide for the content analysis of the recorded, summed and compressed audio data The new method and apparatus will preferably provide for full integration of all non-audio content into the summed signal and will support enhanced filtering of interactions for further analysis of the selected calls.

SUMMARY OF THE INVENTION

The present invention provides for a method and apparatus for processing audio interactions, marking and summing the same. At a later stage the invention provides for a method and apparatus for extraction and processing of the summed channel. The summed channel is marked with control data.

A first aspect of the present invention provides an apparatus for the analysis, marking and summing of audio channel content and control data, the apparatus comprising an audio channel marking component to extract from an audio channel delivering a signal carrying encoded audio content signal-specific characteristics and channel-specific control information, and to generate from the extracted control information and signal characteristics channel-specific marking data, an audio summing component to sum the signal delivered via the audio channel into a summed signal, and to generate signal summing control information; and a marking and summing embedding component to insert the generated marking data and summing data into the summed signal, thereby, generating a summed signal carrying combined audio content, marking and summing data into the summed signal.

The apparatus can further comprise an embedded marking and summing control data extraction component to extract marking and summing data and spectral feature vectors data from the decompressed signal; an audio channel recognition component to identify at least one audio channel from the uncompressed signal associated with the extracted marking and summing control data; and an audio channel separation component to separate the decompressed signal into the constituent channels thereof, thereby, enabling for the extraction and separation of previously generated summed signal.

The apparatus can further comprise a spectral features extraction component to analyze the signal delivered by the audio channel and to generate spectral features vector data characterizing the audio content of the signal. Also included is a compressing component to process the summed audio signal including the embedded marking and summing information in order to generate a compressed signal; an automatic number identification component to identify the origin of the audio channel delivering the signal carrying encoded audio content, a dual tone multi frequency component to extract traffic control information from the signal delivered by the audio channel.

The apparatus can further comprise a group of digital signal processing devices to provide for audio content analysis prior to the marking, summing and compressing of the signal, the group of digital signal processing devices comprising any one of the following components: a talk analysis statistics component to generate talk statistics from the audio content carried by the signal; an excitement detection component to identify emotional characteristics of the audio content carried by the signal; an age detection component to identify the age of a speaker associated with a speech segment of the audio content carried by the signal; and a gender detection component to identify the gender of a speaker associated with a speech segment of the audio content carried by the signal.

The apparatus can also comprise a decompression component to decompress the summed signal, a digital signal processing devices for content analysis, the group of the digital signal processing devices comprising any of the following components: a transcription component to transform speech elements of the audio content of the signal to text; and a word spotting component to identify pre-defined words in the speech elements of the audio content.

Also, the apparatus can comprise one or more storage units to store the summed and compressed signal carrying audio content and marking and summing control data; a content analysis server to provide for channel-specific content analysis of the signal carrying audio content and a content analysis database to store the results of the content analysis.

According to a second aspect of the present invention there is provided a method for the analysis marking and summing of audio content, the method comprising the steps of analyzing one or more signals carrying audio content and traffic control data delivered via one or more audio channels to generate channel-specific control data, and signal-specific spectral characteristics; generating channel-specific marking control data from the channel-specific control data and the signal-specific spectral features vector data; summing the signals carrying audio content into a summed signal; and generating summation control data; and embedding the channel-specific control data, the segment-specific summation data, and the signal-specific spectral features vector data into the summed signal; thereby, generating a summed signal carrying combined audio content, channel-specific control data, segment-specific summation data, and spectral features vector data into the summed signal. The method can further comprise the steps of: extracting the marking and summing data from the summed signal; identifying the channel-specific signal within the summed signal; and separating the channel-specific signal from the summed signal; thereby providing a channel-specific signal carrying channel-specific audio content for audio content analysis.

The method can also comprise the step of compressing the summed signal in order to transform the signal to a compressed format signal; decompress the summed and compressed signal; store the summed signal carrying audio content and marking and summing control data on a storage device; obtain the summed signal from the storage device in order to perform audio channel separation and channel-specific content analysis; and storing the results of the content analysis on a storage device to provide for data mining options for additional applications; marking of the audio channel in accordance with the traffic control data carried by the at least one signal. The separation of the summed signal is performed in accordance with the traffic control data carried by the signals. The marking of the at least one audio channel is accomplished through selectively marking speech segments included in the at least one signal associated with different speakers. The separation of the summed signal is accomplished through selectively marking speech segments included in the signals associated with different speakers. The embedding of the marking and summing control data in the summed signal is achieved via data hiding. The data hiding is performed preferably by the pulse code modulation robbed-bit method or by code excited linear prediction compression method.

The method may be operative in a first stage of the processing in the generation of a summed signal carrying encoded audio content and marking and summing control data and providing in a second stage of the processing a channel-specific signal carrying channel-specific audio content for audio content analysis.

BRIEF DESCRIPTION OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE PREFERRED EMBODIMENT

Figure 1:
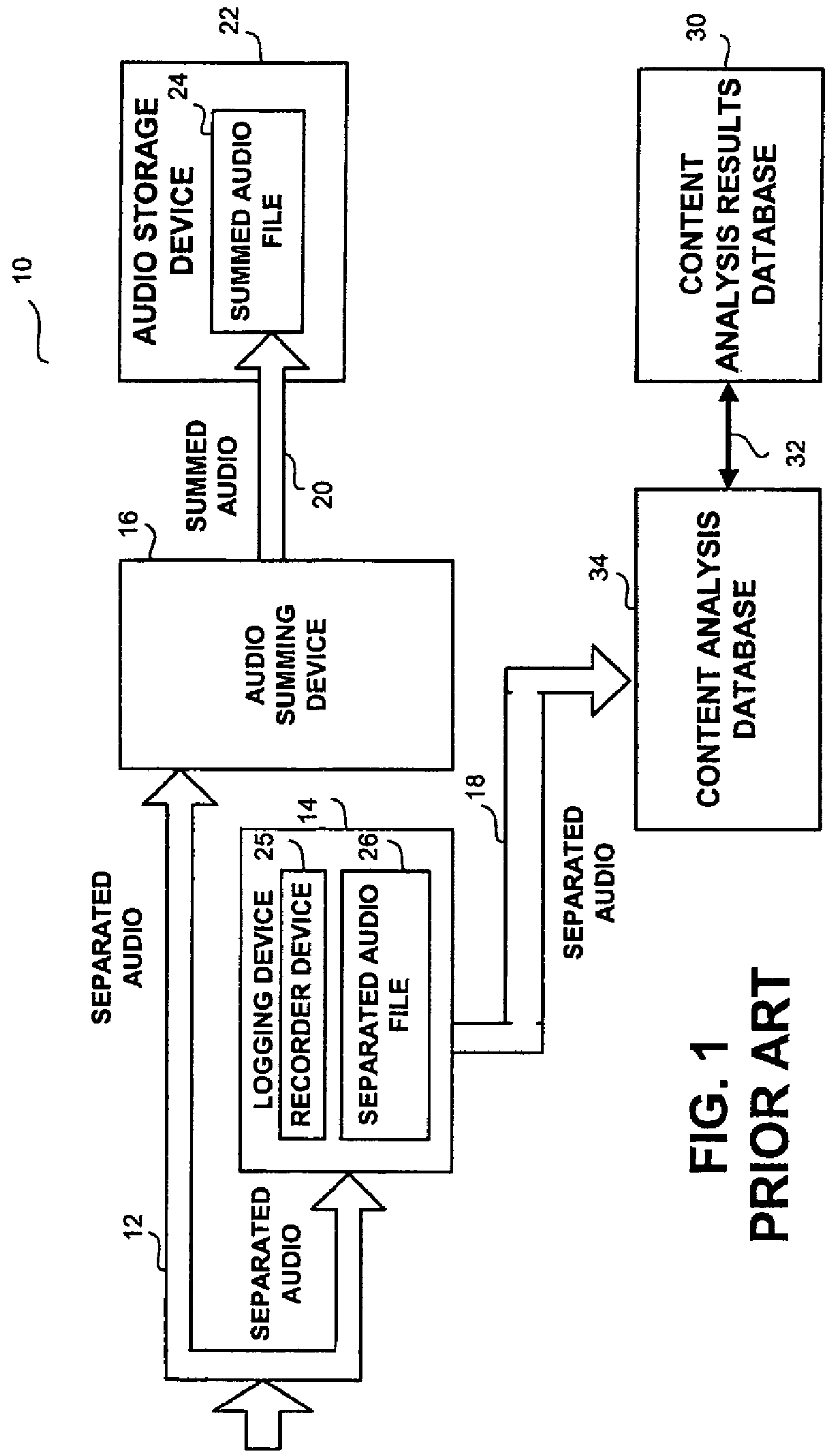
FIG. 1 PRIOR ART
FIG. 1 is a schematic block diagram of an audio content analysis apparatus, known in the art.

An apparatus and method for content analysis-related processing of two or more time synchronized audio signals constituting an audio interaction is disclosed. Audio interactions are analyzed, marked and summed into one channel. The analysis and control data are also embedded into the same summed channel.

Two or more discrete audio signals generated during an audio interaction are analyzed. The audio signals received separately from distinct input channels and marked in order to identify the source of the signals (telephone number, line, extension, LAN address) the type of the signals (speech, tone, silence, noise, and the like), and the length of signal segments during an audio content analysis. Particular elements of the content analysis, such as speaker verification, word spotting, speech-to-text, and the like, which typically obtain low-level performances when processing a summed audio signal, are performed on the separate signals prior to marking, summing, compressing, and storage of the audio signals. Subsequent to the performance of the particular content analysis specific segments of the audio signals are marked, summed, compressed and stored appropriately as a marked, summed and compressed integrated signal. Channel-specific notational control data is generated during the processing of the separate signal. Notational control data includes technical channel information, such as the identification or the source of the channel and technical audio segment information, such as the type and length of the audio segment. The notational control data is stored simultaneously in order to be provided as control information for subsequent processing. In addition, speech features vectors and spectral features vectors are extracted from the signal by specific pre-processing modules. During the summation of the channels segment-specific summation control data, such as signal segment number, segment length, and the like, is generated, and added to the notational control data. The channel-specific notational control data, the segment-specific summation control data, the speech features vector data, and the spectral features vector data are embedded into the summed audio signal. Next, or a later time, an analysis is performed by a content analysis server that utilizes the marked, summed, compressed and stored audio signal with the embedded control data associated with the signal stored on a storage device.

The proposed apparatus and method provide several major advantages. The utilization of a specific hardware logging could be dispensed with and thereby cost and time of installation, maintenance or upgrade are substantially reduced. The proposed solution could be hardware-based, software-based or any combination thereof. As a result, increased flexibility is achieved with substantially reduced material costs and development time requirements. The summation and the compression of the originally separate audio signals provide for reduced storage requirements and therefore accomplish lower storage costs. A practically complete reliability of channel separation is achieved despite the summed audio storage, since the channel separation is based on a Mark & Sum (M&S) computer program operative within the apparatus of the present invention.

The M&S computer program is implemented and is operating within the computerized device of the present invention. The M&S program is operative in the channel-specific notation of the audio signal segments. The channel notation is established by the parameters of the audio signal, such as the source of the audio signal, the type of the audio signal, the type of the signal source, such as a specific speaker device, telephone line, extension, Local Area Network (LAN) address, and the like. The M&S program further operative in the summation of the audio signal segments. The output resulting from the processing is a summed signal that consists of successive audio content segments. The summed signal is subsequently compressed. The M&S program comprises two main modules: the channel marking module and the channel summing module. The channel marking module is operative in the extraction of the traffic-specific parameters of the signal, such as the signal source and other signal information. The channel marking module is further operative in the extraction of audio stream characteristics, such as inherent content-based information, energy level detection, and the like. The marking module is still further operative in the encoding of the control data and audio stream characteristics and in the marking of separate audio streams by robbing bits to embed the identified characteristics of the stream as an integral part of the video stream for later usage (channel separation, analysis, statistics, further processing, and the like). The summing module is operative in the summing of the separate streams (including the embedded identified characteristics of the signal) where the summed signal consists of successive signal segments. Note should be taken that the marking and summing modules could be co-located on the same integrated circuit board or could be implemented across several integrated circuit boards, across several computing platforms or even across several physical locations within a network. The M&S program is typically more reliable than conventional audio analysis. Since processing is preferably performed in real-time, alerts and appropriate alert-specific pre-defined response options related to non-linguistic content can be provided in real-time as well. The proposed solution provides flexible, efficient and easy packaging of the various hardware/software components. For example, the processing could be configured such as to be built-in within the logging device and activated optionally via pre-installed Digital Signal Processing (DSP) components. Furthermore, the DSP components could be post-installed during optional system upgrades. As mentioned above, the various physical parts of the system may be located in a single location or in various locations spread across a few buildings located remotely one from the other.

Figure 2:
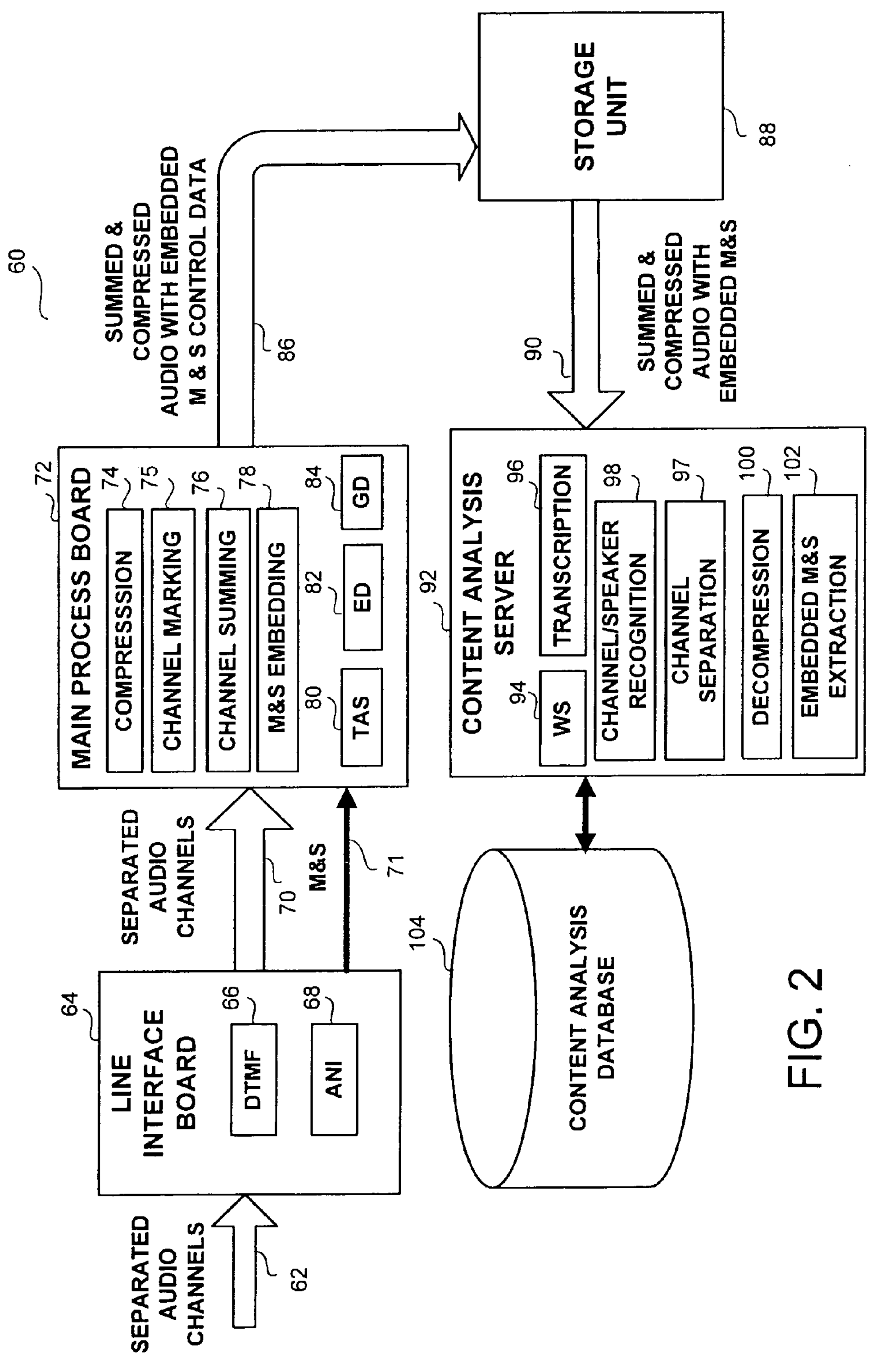
FIG. 2 is a schematic block diagram of a mark and sum audio content analysis apparatus, in accordance with a first preferred embodiment of the present invention.

Referring now to FIG. 2 in the first preferred embodiment of the invention the apparatus 60 provides for a content analysis-related processing. The processing includes the extraction of non-linguistic content from audio signals received from input channels via the utilization of specific modules. The processing further includes the execution of the M&S program. The analysis of the audio signal segments generates channel-specific notational control data, which is embedded within the summed and compressed signal using audio data hiding techniques. A more detailed description of the audio data hiding techniques will be provided herein under. The summed and compressed audio signal carrying the embedded channel-specific notational control data and the accompanying extracted content are stored on a storage device. Next, the notational control data embedded in the summed, compressed and stored audio signal, the stored audio, and the complementary audio-based content can be extracted from the storage device by a content analysis server or program and an Automatic Speech Recognition (ASR) analysis or like analysis can be performed. Selection of the audio signal for ASR processing is executed in accordance with rules formed by using the results of the processing as filtering criteria. Through the utilization of notational control data generated in the processing, such as the channel source and other information, the content analysis server or program can extract summed and compressed records of the audio interactions and enable the separate processing of each audio channel through the extraction and decoding of the notational control data embedded within the summed audio signal and logically associated with the audio signal segments therein. Preferably, the first processing, marking, summing and embedding the data provided by the processing step is accomplished first. The result is a single channel including summed audio channels and data obtained in the processing step. The extraction of the audio channels summed and the control data embedded and later analysis of the extracted information can be accomplished at any given time on the single channel created by the invention of the present invention.

Still referring to FIG. 2 the proposed apparatus 60 includes a line interface board 64, a main process board 72, a storage unit 88, a content analysis server 92, and a content analysis database 104. The line interface board 64 is a DSP or like unit that is responsible for the capturing of audio data and channel control data from the audio signal input lines. The line interface board 64 provides for the identification of the audio channel parameters. The line interface board 64 includes a set of DSP components where each component provides specific channel identification functionality. The set of DSP components includes a Dual Tone Multi Frequency (DTMF) detection component 66, and an Automatic Number Identification (ANI) component 68. The components 66 and 68 are operative in the extraction of the traffic-specific parameters of inputted separate audio channels, such as the number of the caller and other information relating to the caller such as extension number and other information available via ANI and DTMF. The main process board 72 is a DSP unit, such as a Universal DSP Array (UDA) board, that includes a compression component 74. The compression component 74 of the board 72 performs known compression algorithms, such as the g.729a and the g.723.1 compression algorithms and the like, for both audio channels. The board 72 also includes audio-based DSP components, such as a Talk Analysis Statistics (TAS) component 80, an Excitement Detection (ED) component 82, and a Gender Detection (GD) component 84. The board 72 further includes a channel marking component 75, a channel summing component 76, and an M&S embedding component 78. The main process board 72 is provided with sufficient processing power to provide for the performance of channel indexing, channel notational control data generation, audio summing, M&S embedding, and summed audio compression. The content analysis server 92 includes a set of audio-based DSP components where each component is having a specific functionality. The server 92 performs linguistic analysis by transcribing speech to text through the operation of a transcription component 96. The server 92 utilizes the channel notational control data generated and embedded into the summed audio signal during the processing in order to separate between the audio signals respectively associated with the separate input channels and additional content data such as the gender associated with the user of the channel in order to improve accuracy. The DSP components include a word-spotting (WS) component 94, a transcription component 96, a channel recognition component 98, a channel separation component 97, a decompression component 100, and an embedded M&S extraction component 102.

The line interface board 64 is coupled on one side to at least two separated audio input channels that provide separated audio signals 62 constituting one or more audio interactions to the board 64. It will be appreciated that one line interface board 64 may be connected to a large number of lines (line-arrays) feeding separated audio channels or to a limited number of lines feeding a large number of summed audio channels. The separated audio signals 62 are processed by the line interface board 64 in order to provide for audio channel parameter identification. The audio channel identification is accomplished by the DTMF component 66 and the ANI component 68. The ANI component 68 in association with the DMF component 66 extract from the audio signal traffic-specific control signals that identify the signal source, signal source type, and the like. The DTMF component 66 is further capable of identifying additional traffic-specific parameters, such as a line number, a LAN address, and the like. In the first preferred embodiment of the invention, the separated audio signal 70 together with DTMF and ANI mark and sum information 71 is fed to the main process board 72 via an H.100 hardware bus for further processing. The audio segments are marked by the channel marking component 75 in accordance with the traffic-related parameters of the audio channel, such as the source of the audio signal, and the like. The separated audio signals are further processed by the various audio content analysis components. The components include an ED component 82, a GD component 84, a TAS component 80, and the like. The ED component 82 is operative in the identification of the emotional state of a speaker that generated the speech elements in the audio content. The GD component 84 is responsible for the identification of gender of a speaker that generated the speech elements in the audio content. The TAS component 80 is operative in the identification of a speaker that generated the speech elements in the audio content by creating talk statistics tables. The marked audio signals are then summed by the channel summing component 76. The audio segments are summed where the summed signal includes a set successive segments. During the summation process the channel-specific notational control data generated by the channel marking component 75 is embedded into the summed signal by the M&S embedding component 78. The embedding of the control data is accomplished by the utilization of data hiding techniques. A more detailed explanation of the techniques used will be described herein under.

The control data generated by the channel marking component 75 includes traffic-specific channel identification information, such as the channel source (telephone number, extension number, line number, LAN address). The notational control data could further include audio segment length, audio type (speech, noise, pause, silence), and the like. The channel control data is suitably encoded in order to enable the insertion thereof into the summed signal. The channel-specific notational control data resulting from the processing of the separated signals performed by the channel marking component 75 is sent within the summed signal 86 to the storage unit 88. The storage unit 88 stores the summed and compressed audio signals representing audio interactions and carrying embedded notational control data. The storage unit 88 also stores audio-based content indexed by interaction identification. Following the performance of the ASR modules, such as DTMF, ANI, GD, ED, WS, Age Detection (AD), TAS, word indexing, and the like, the resulting information is stored in the content analysis database 104. Subsequently, the content analysis database 104 could be further utilized by specific data mining applications.

Still referring to FIG. 2 the content analysis server 92 includes a decompression component 100, an embedded M&S extraction component 102, a channel/speaker recognition component 98, a channel separation component 97, a transcription component 96, and a WS component 94. The content analysis server 92 obtains the summed and compressed audio signal 90 carrying the embedded channel notational control data from the storage unit 88. The summed and compressed audio signal is decompressed by the decompression component 100. The embedded channel notational control information is extracted from signal by the embedded M&S extraction component 102. The summed and decompressed audio signal is separated into the constituent audio channels by the channel/speaker recognition component 98 and the channel separation component 97 where the separation is accomplished consequent to the extraction of the embedded channel-specific notational control data from the audio signal and the to the utilization thereof. The separated audio channels are subsequently processed by the transcription component 96 and by the WS component 94. The results of the analysis are stored on the content analysis database 104. While the figure shown describes the processing, marking and summing together with the extraction and analysis of the summed channel it will be readily appreciated that a summed channel may be extracted and analyzed at a later stage in accordance with predetermined request or rules.

Audio data hiding is a method to hide low data bit rate in an encoded voice stream with negligible voice quality modification during the decoding process. The proposed apparatus and method utilizes audio data hiding techniques in order to embed the M&S control information into the audio content stream. The proposed apparatus and method could implement several data hiding methods where the type of the data hiding method is selected in accordance with the compression methods used. Data hiding or steganography refers to techniques for embedding watermarks, signatures, tamper prevention, and captioning in digital data. Watermarking is an application, which embeds the least amount of data but requires the greatest robustness because the watermark is required for copyright protection. A watermark, unlike encryption, does not restrict access to the associated content but assists application systems by hiding data within the content. For the proposed apparatus and method the data hiding techniques would have the following features: a) the compressed audio with the embedded control data would be decompressed by a standard decoder device with perceptually minor quality degradation, b) the embedded data would be directly encoded into the media, rather than into the header, so that the data would remain intact across diverse data formats, c) preferably asymmetrical coding of the embedded data would be used since the purpose of water-marking is to keep the data in the audio signal but not necessarily making the data difficult to access, d) preferably low complexity coding of the embedded data would be utilized in order to reduce potential degradation in the performance of the system in terms of running time by the performance of the water-marking algorithm, and e) the proposed apparatus and method do not involve requirements for data encryption.

It was mentioned herein above that in the applicable preferred embodiments of the present invention various data hiding techniques would be utilized in order to accomplish the seamless embedding and the ready extraction of the control data into/from the summed audio content stream. Some of these exemplary data hiding techniques will be described next.

a) The Pulse Code Modulation (PCM) robbed-bit method: Robbed-bit coding is the simplest way to embed data in PCM format (8 bit per sample). By replacing the least significant bit in each sampling point by a coded binary string, a large amount of data could be encoded in an audio signal. An example of implementation is described by the American National Standards Institute (ANSI) T1.403 standard that is utilized for the T-1 line transmission. In the proposed apparatus and method the decoding is bit exact in comparison with the compressed audio and the associated Mark and Sum control data. Thus, no distortion would be detected except for the watermarking. The degradation caused by the performance of the ASR module is negligible when compared to the original PCM channel. The implementation of the PCM robbed-bit coding method provides for the preservation of all the above-described features required by the proposed apparatus and method, i.e. the features a, b, c, d that have been mentioned in the previous paragraph. A major disadvantage of the PCM robbed-bit method is the vulnerability thereof to problematic compression.

b) The Code Excited Linear Prediction (CELP) compression method: CELP is a family of low bit-rate vocoders in the range of from 2.4 Kb/s up to 9.6 Kb/s. An example based on CELP vocoder is described in the International Telecommunications Union (ITU) g.729a standard. Statistical or perceptual gaps that could be filled with data are likely targets for removal by lossy audio compression. The key for successful data hiding is the locating of those gaps that are not suitable for exploitation by compression. CELP type compression readily preserves the spectral characteristics of the original audio. For example, the data could be hidden in the low significant spectral features, such as the LPC or the LSP or as short tones period.

Figure 3:
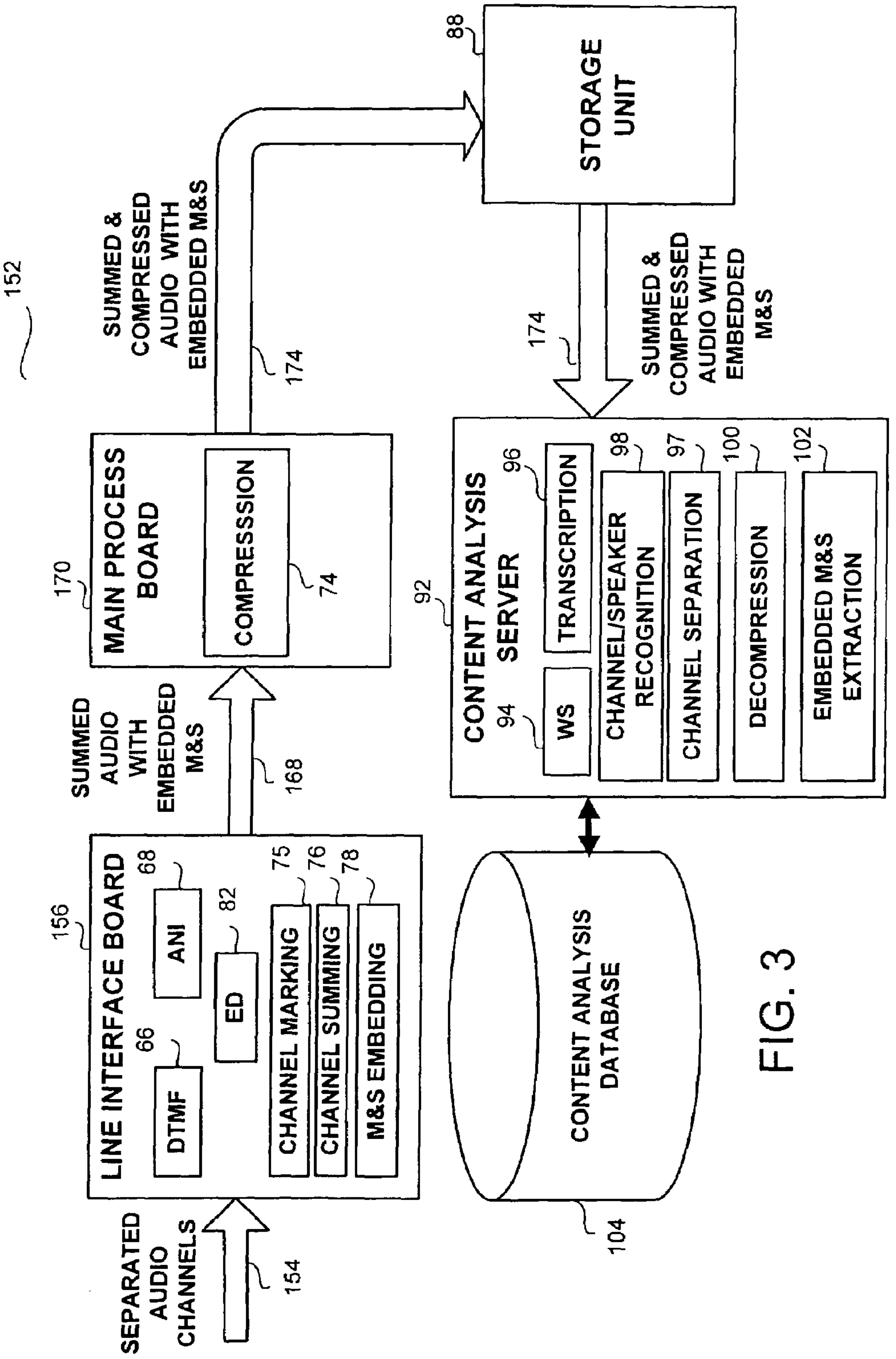
FIG. 3 is a schematic block diagram of the mark and sum audio content analysis apparatus, in accordance with a second preferred embodiment of the present invention.

Referring now to FIG. 3 that that shows the proposed apparatus 152, in accordance with the second preferred embodiment of the present invention. The configuration of the apparatus 152 in the second preferred embodiment is different from the configuration of the apparatus in the first preferred embodiment. As a result the logical flow of the execution further differs between the first and the second preferred embodiments. In the second preferred embodiment, the modules constituting the M&S program are installed on the line interface board instead of the main processing board. Certain content analysis components the performance of which is more efficient where processing separated audio streams are also installed in the line interface board instead of the main processing board in order to enable separate channel-specific audio analysis prior to the execution of the M&S program. Thus, in the second preferred embodiment of the invention, the line interface board outputs summed audio with embedded M&S control data to be fed to the main process board. The main process board is responsible for the compression of the summed audio data received from the line interface board and in the feeding of the summed and compressed audio stream to a audio storage device. Still referring to FIG. 3 the processing the apparatus 152 includes a line interface board 156, and a main process board 170. The line interface board 156 includes a DTMF component 66, an ANI component 66, an ED component 68, a channel summing component 76, a channel marking component 75, and an M&S embedding component 78. The main process board 170 includes a compression component 74. Audio signals from two or more separated audio channels 154 constituting an audio interaction are fed into the line interface board 156. The separated signal 154 is processed by the components installed on the line interface board 156. First, the separated audio 154 is processed by pre-summation audio content analysis routines, such as implemented by the ED component 82. Pre-summation processing is performed since specific content analysis routines operate in a more ready and more efficient manner (high ASR performance) on a pre-summed separated audio signal than on a post-summed and re-separated audio signal. The DTMF component 66 and the ANI component 68 process the signal 154 in order to identify the separated signal parameters. Then, the separate signal segments of the signal 154 are marked by the channel marking component 75 and summed into an integrated summed channel summing 76. The M&S embedding component 78 inserts the M&S control data generated by the channel marking component 75 into the summed signal and generates a summed audio signal with embedded M&S 168. The signal 168 is fed to the main process board 170 in order to be compressed by the compression component 74. Subsequently, the summed and compressed audio signal with the embedded M&S information 174 is transferred to the storage unit 88 in order to be stored and readied later extraction and processing. Note should be taken that in other embodiments the compression stage could be dispensed with and the summed audio with embedded M&S 168 transferred directly to the storage device 88 without being compressed. In such a case, the decompression component 100 of the content analysis server 92 could be dispensed with as well.

Figure 4:
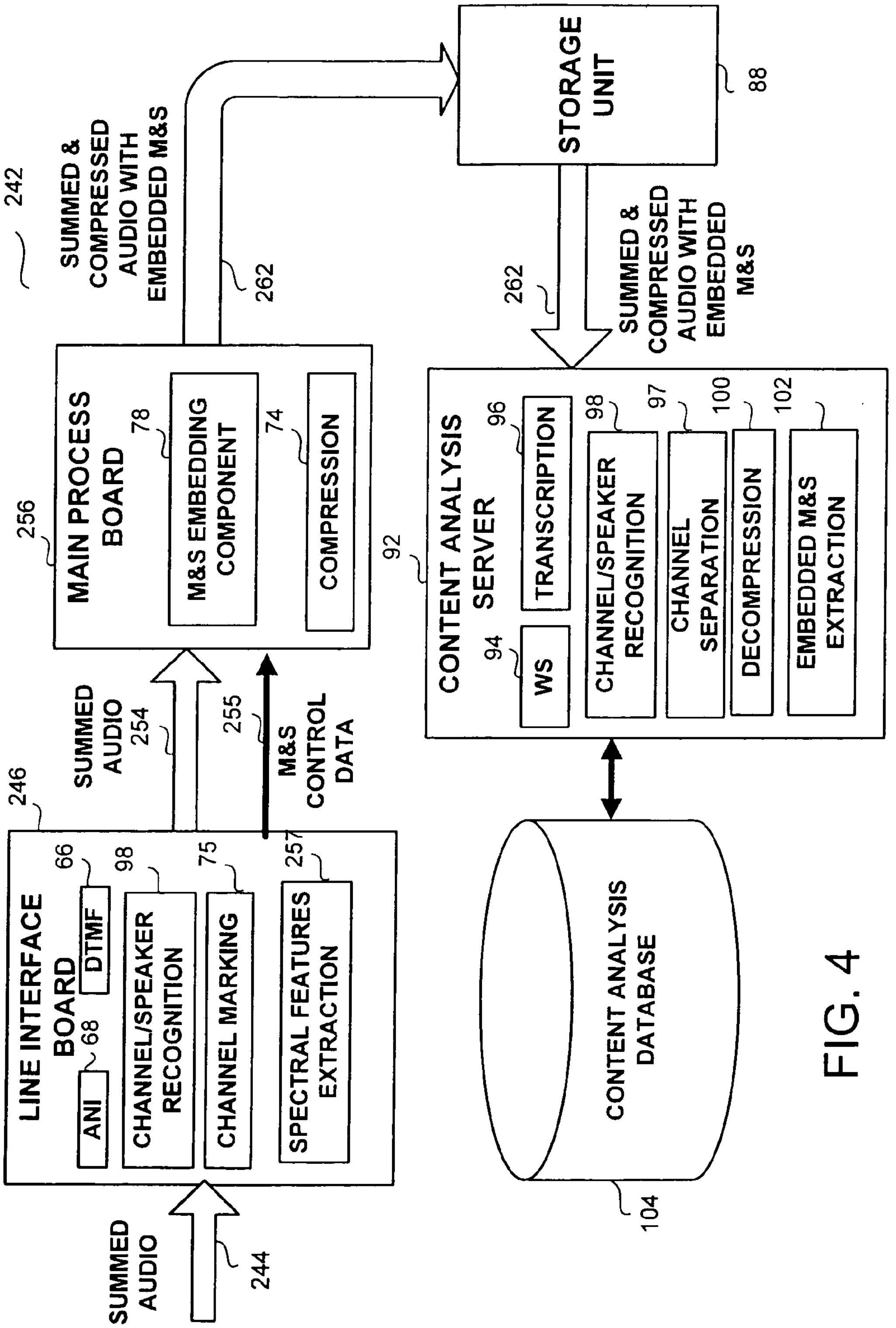
FIG. 4 is a schematic block diagram of the proposed mark and sum audio content analysis apparatus, in accordance with a third preferred embodiment of the present invention.

Referring now to FIG. 4 that shows a proposed apparatus 242 configured in accordance with the third preferred embodiment of the present invention. The output of the processing in the third preferred embodiment is practically identical to the output of the processing in the first and second preferred embodiments. The configuration of the apparatus in the third preferred embodiment is different from the configuration of the apparatus in the first and second preferred embodiments. As a result the logical flow of the execution further differs between the first and the second preferred embodiments and the third preferred embodiment. In this embodiment, a pre-summed audio signal is received by the apparatus. As a result, the need for the summation of audio channels is negated. The channels constituting the summed audio stream have to be separately recognized and marked. The identification of the channels is accomplished by the use of speech recognition techniques associated with the M&S program installed on the line interface board. Consequent to the identification of the channels and the generation of channel-specific control data, the summed audio and the control data is separately transferred to the main process board. The embedding of the control data into the summed audio stream and compression of the summed audio data is performed on the main process board. Then, the summed and compressed audio is transferred to a audio storage unit.

Still referring to FIG. 4 the apparatus 242 includes the elements operative in the execution of the processing: a line interface board 246, and a main process board 256. The line interface board 246 includes a DTMF component 66, an ANI component 68, a channel marking component 75, a spectral features extraction component 257, and a channel/speaker recognition component 252. The responsibility of the DTMF component 66 and the ANI component 68 is to identify the parameters of the audio channels. The function of the channel/speaker recognition component 98 is to recognize and identify the channels/speakers (users' speech) constituting the summed audio. The component 98 accomplishes channel or speaker recognition by utilizing an automatic speech recognition module (not shown). The speech recognition module could utilize the cepstral analysis method. The channel marking component 75 is responsible for the marking of the audio signal segments with the channel control data provided by the channel/speaker recognition component 98. Thus, the summed audio signal 244 is fed to the line interface board 246 in order to be processed by the DTMF component 66, the ANI component 68 for audio channel parameters identification and in order to be enable the channel marking component 75 to mark the audio segments of the summed audio signal. Consequently, the summed audio signal 254 and the M&S control data 255 generated by the channel marking component 75 are transferred to the main processing board 256. The board 256 includes an M&S embedding component 78 and a compression component 74. The component 78 inserts the M&S control data into the summed audio signal using the above-mentioned audio hiding techniques. Then, the audio signal is compressed by the compression component 74. The summed & compressed audio signal carrying the embedded M&S 262 is fed to the storage unit 88 in order to be stored and to be readied for the later extraction and processing. In other preferred embodiments of the invention the compression step of the processing could be dispensed with. In such a case a summed, uncompressed audio signal, carrying the embedded M&S signal 262 could be stored on the storage unit 88. Thus, the decompression component 100 of the content analysis server 92, which is operative in the later extraction and processing, could be dispensed with as well. The spectral features extraction component 257 analyses the summed audio 244 and extracts specific characteristic of the summed audio 244, such as speech features vectors and spectral features vectors. The feature vectors are transferred to the main board 256 with the M&S control data and embedded into the summed signal by the M&S embedding component 78. The above-mentioned features concern speech characteristics, such as pitch, loudness, frequency, and the like. The speech processing of the signal could be performed via Linear Predictive Coding (LPC). LPC is a tool for representing the spectral envelope of the signal of the speech in compressed form using the information in a linear predictive model. In the third preferred embodiment of the present invention the spectral envelope is transmitted to and stored on the storage unit 88 and utilized as input to the content analysis application.

Figure 5:
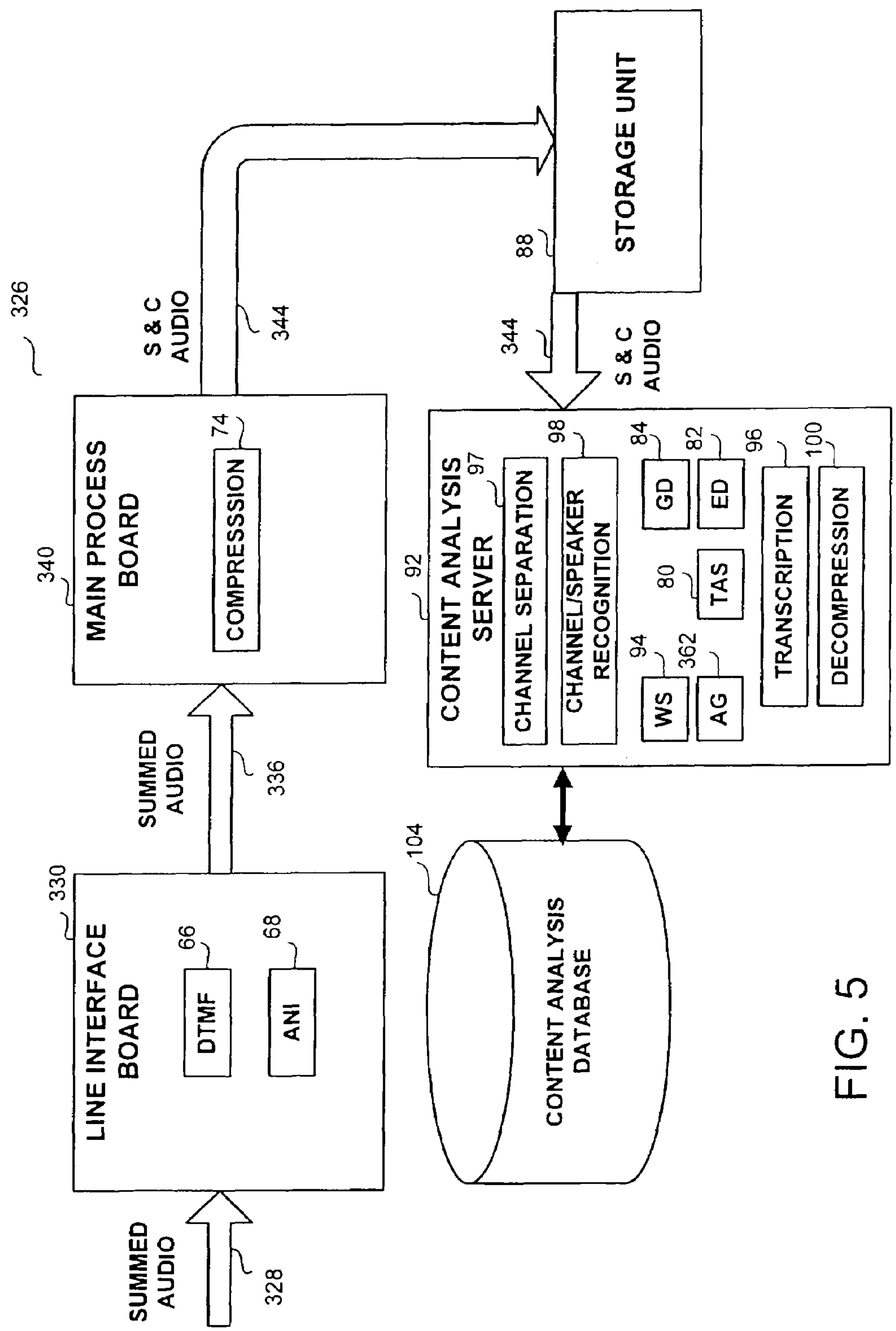
FIG. 5 is a schematic block diagram of the proposed mark and sum audio content analysis apparatus, in accordance with a fourth preferred embodiment of the present invention.

Referring now to FIG. 5 that shows the proposed apparatus 326 configured in accordance with the fourth preferred embodiment of the present invention. The processing includes the extraction of non-linguistic content from audio signals received from input channels. The processing step further includes the optional step of compressing the audio signals. The output resulting from the processing is compressed audio signal, which is stored on a storage device. Next or at a later time the summed and compressed audio is decompressed and separated to the constituent channels thereof. Subsequently, content analysis is performed. The recognition of a distinct audio channel can be accomplished by automatic speech recognition based on cepstral analysis, for example, or like algorithms.

Still referring to FIG. 5 the proposed apparatus 326 includes a line interface board 330, a main process board 340, a storage unit 88, a content analysis server 92, and a content analysis database 104. The line interface board 330 is a DSP unit that is responsible for the capturing of the summed audio data 328 from an audio signal input line. The board 330 provides for channel parameter identification. The board 330 includes a set of DSP components where each component provides for specific channel identification functionality. The set of DSP components includes a DTMF detection component 66, and an ANI component 68. The main process board 340 includes a compression component 74. The compression component 74 installed on the board 340 performs known compression algorithms, such as the g.729a and the g.723.1, for the summed audio channel. The content analysis server 92 includes a set of audio-based DSP components. The server 92 performs linguistic analysis via extracting text from speech by a transcription component 96. The server 92 utilizes the channel/speaker recognition component 98, and the channel separation 97 in order to separate between the audio signals respectively associated with the separate input channels and additional content data such as the gender associated with the user of the channel in order to improve accuracy. The DSP components include a WS component 94, a transcription component 96, a channel/speaker recognition component 98, and a channel separation component 97, a decompression component 100. The line interface board 330 is coupled on one side to an audio input channel that provides a summed audio signal 328 constituting an audio interaction to the board 330. The summed audio signal is processed by the board 330 in order to provide for audio source parameters identification. The identification is accomplished by the DTMF component 66 and the ANI component 68. The summed audio signal 336 is transferred to the main process board 340 via an H.100 hardware bus for further processing. The storage unit 88 is operative in the storage of summed and compressed audio signals representing audio interactions. The storage unit 88 is further operative in the storage of audio-based content indexed by interaction identification. The content analysis database 370 stores the results of the content analysis routines, such as DTMF, ANI, GD, ED, WS, AD, TAS, word indexing, channel indexing, and the like. The content analysis database 104 could be further utilized by specific data mining applications.

Still referring to FIG. 5 the content analysis server 92 includes a decompression component 100, a channel/speaker recognition component 98, a transcription component 96, a channel separation component 97, a WS component 94, an AG component 362, a TAS component 80, a GD component 84, and an ED component 82. In the later step of the extraction and processing the server 92 obtains the summed and compressed audio signal from the storage unit 88. The summed and compressed audio signal is decompressed by the decompression component 100. The summed and decompressed audio signal is separated into the constituent audio channels by the channel/speaker recognition component 98 and the channel separation component 97. The content of the separated audio channels are subsequently analyzed by the WS component 94, the AG component 362, the TAS component 80, the GD component 84, the ED component 82, and the transcription component 96. The results of the analysis are stored on the content analysis database 104.

Figure 6:
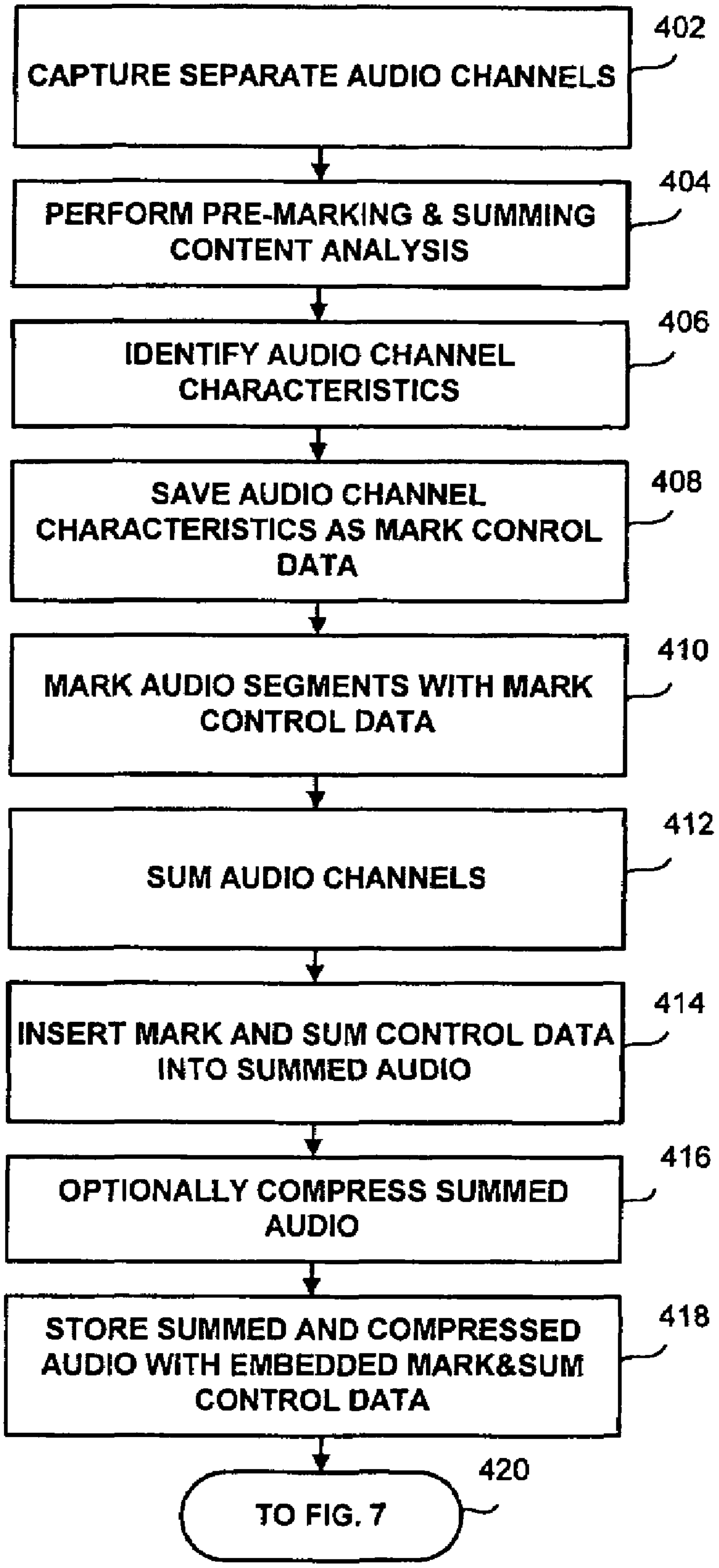
FIG. 6 is a high level flow chart showing the operational stages of the processing of the mark and sum audio content analysis method, in accordance with a preferred embodiment of the present invention.

Referring now to FIG. 6 showing the steps of the processing of the method of the preset invention. In step 402 the separate audio channels are captured and in step 404 pre-marking and pre-summing content analysis routines are performed. The content analysis routines required to be performed at this step are typically utilize algorithms that are more efficient in the processing of separate audio channels that in the processing of summed channels. In step 406 the parameters and the characteristics of the separate audio channels are identified and at step 408 the parameters are saved. The control data and the signal characteristics of the separate audio channels are extracted via the utilization of specific modules. For example, the source of the audio channel, that could be a telephone number, a line extension, or a LAN address, is identified via the operation of an ANI module and/or a DTMF module. The speech feature vectors and the spectral feature vectors of the audio signal, such as pitch and loudness are extracted via the utilization of an LPC module. At step 410 the audio signal segments of the separate audio channels are marked. The marking involves processing the extracted control data and speech/signal feature vectors in order to generate encoded parameters that reflect the characteristics of the channel and associating the encoded parameters with the relevant audio segments. Marking can include data referring to the start and end of a conversation, the type of speech, the type of signal, the length of a conversation, an identity of each speaker and any other data which can be helpful in the later analysis of the summed channel. One non limiting example would be to note the time points at which each speaker begins and ends to speak, the gender of each speaker, the extension of the lines from which each source arrived, the pitch or loudness of the voice of each speaker which may denote stress levels and the like. Persons skilled in the art will appreciate the many other like information that can be marked in respect of an audio interaction. At step 412 the separate audio channels are summed into an integrated summed audio signal. The summed signal consists of a set of successive audio segments each appropriately marked in regard with the signal segment parameters. In step 414 the mark and sum control data and the signal characteristics information, such as speech feature vectors, generated in step 410 are inserted into the summed audio signal via the utilization of data hiding techniques that were described in detail herein above. The hiding techniques enable the embedding of the control data in the same summed signal channel used to sum the combined audio sources. Thus, a single channel result, such channel includes not only the audio interactions of one or more speakers but also data resulting from the processing of the interactions and signals summed. At step 416 the summed signal carrying the mark and sum control data is optionally compressed. The processing is terminated at step 418 by the storage of the marked, summed, and compressed audio signal with the embedded mark and sum control data and the embedded speech/spectral feature vectors. Step 420 may occur next or at a later stage. Thus, the later extraction and processing may be performed at the any given time after the initial processing and saving of the audio stream to the storage device is complete.

Figure 7:
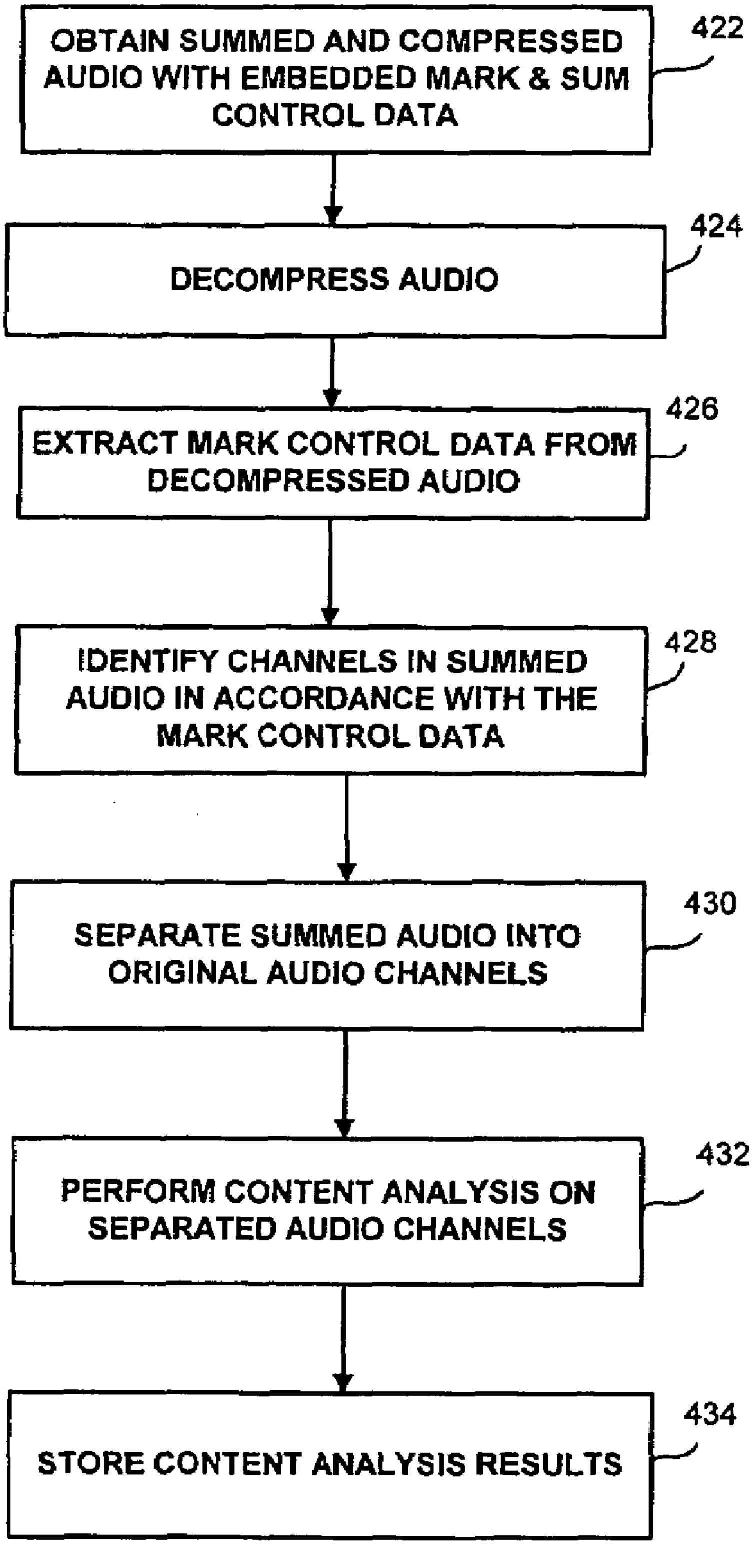
FIG. 7 is a high level flow chart describing the operational stages of the later extraction and processing of the mark and sum audio content analysis method, in accordance with a preferred embodiment of the present invention.

Referring now to FIG. 7 showing the operational steps of the next or later extraction and processing, in accordance with the method of the present invention. In step 422 the summed and compressed audio signal carrying the embedded mark and sum control data, and the spectral features vector data is obtained from the storage unit by the automatic or manual activation of the content analysis server. In step 424 the audio signal is decompressed and in step 426 the M&S control data and the speech/spectral features vector data are extracted from the summed and decompressed audio signal via the utilization of the above-mentioned data hiding techniques. In step 428 the summed and decompressed audio signal is processed in order to identify the audio channels constituting the integrated signal. The identification of a channel is accomplished by processing the extracted marking information. The channel identification is encoded in the marking data. Following the extraction of the M&S data the channel identification code is obtained and the associated audio segment is identified. In step 430 the audio segments are separated from the summed signal in order to reconstruct the original audio channelsIn step 432 one or more content analysis routines are performed on the reconstructed audio channel separately and at step 434 the results of the content analysis process are saved. The content analysis routines could include speech analysis components, such as a WS component, a Speech-to-Text (transcription) component, a GD component, an AG component, a TAS component, and the like. It should be stressed that the apparatus, in accordance with the entire set of the preferred embodiments of the present invention as described above is operative in the marking, summation, and compression of the separately received audio channels, in the embedding of the channel-specific notational control data and additional speech/spectral features vector data in the summed signal and in the transferring of the summed, and compressed audio signal carrying the embedded notational control data for storage and subsequent content analysis. In order to analyze the stored audio signal the embedded notational control data and the spectral features vector data is extracted from the summed signal and utilized for the purpose of recognizing the original channels, separating the summed signal to the constituent channels and of analyzing the channels separately.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

What is claimed is:

1. An apparatus for the analysis, marking and summing of at least two separate time-synchronized audio channels delivering at least two separate signals carrying encoded audio content and control data, the apparatus comprising:

an at least one audio channel marking component to extract from at least one of the at least two separate time-synchronized audio channels, signal-specific characteristics and channel-specific control information, and to generate from the extracted control information and signal characteristics channel-specific marking data;

an at least one audio summing component to sum the at least two separate signals into a summed signal, and to generate signal summing control information; and an at least one marking and summing embedding component to insert the generated marking data and summing control information into the summed signal, wherein said marking and summing embedding component embeds said control information by data hiding, thereby generating a summed signal carrying combined audio content, marking data and summing control information into the summed signal.

2. The apparatus of claim 1 further comprising:

an at least one embedded marking and summing control data extraction component to extract marking data and summing data and signal-specific characteristics and channel-specific control information from the summed signal;

an at least one audio channel recognition component to identify at least one audio channel from the summed signal associated with the extracted marking and summing control data; and an at least one audio channel separation component to separate the summed signal into the constituent separate time-synchronized channels thereof;

thereby enabling for the extraction and separation of previously generated summed signal.

3. The apparatus of claim 2 further comprising at least one digital signal processing device for content analysis, the at least one digital signal processing device is selected from the group consisting of:

a transcription component to transform speech elements of the audio content of the signal to text; and a word spotting component to identify pre-defined words in the speech elements of the audio content.

4. The apparatus of claim 2 further comprising at least one content analysis server to provide for channel-specific content analysis of the signal carrying audio content and an at least one content analysis database to store the results of the content analysis.

5. The apparatus of claim 1 further comprising an at least one spectral features extraction component to analyze the signal delivered by the at least one audio channel and to generate spectral features vector data characterizing the audio content of the signal.

6. The apparatus of claim 1 further comprising a compressing component to process the summed audio signal including the embedded marking data and summing control information in order to generate a compressed signal.

7. The apparatus of claim 6 further comprising a decompression component to decompress the summed signal.

8. The apparatus of claim 1 further comprising an automatic number identification component to identify the origin of the at least one audio channel delivering the signal carrying encoded audio content.

9. The apparatus of claim 1 further comprising a dual tone multi frequency component to extract traffic control information from the signal delivered by the audio channel.

10. The apparatus of claim 1 further comprising an at least one group of digital signal processing devices to provide for audio content analysis of at least one of the at least two separate audio channels prior to the marking and summing of the signal, the group of digital signal processing devices comprising any one of the following components:

a talk analysis statistics component to generate talk statistics from the audio content carried by the signal;

an excitement detection component to identify emotional characteristics of the audio content carried by the signal;

an age detection component to identify the age of a speaker associated with a speech segment of the audio content carried by the signal; and a gender detection component to identify the gender of a speaker associated with a speech segment of the audio content carried by the signal.

11. The apparatus of claim 1 further comprising at least one storage unit to store the summed signal carrying audio content and marking and summing control data.

12. A method for the analysis, marking, and summing of at least two separate time-synchronized audio channels delivering at least two separate signals carrying encoded audio content, and control data , the method comprising:

analyzing at least one of the at least two separate signals carrying audio content and traffic control data, to generate channel-specific control data, and signal-specific spectral characteristics;

generating channel-specific marking control data from the channel-specific control data and the signal-specific spectral characteristics;

summing the at least two separate signals carrying audio content into a summed signal and generating summation control data;

embedding the channel-specific control data, the summation control data, and the signal-specific spectral characteristics into the summed signal thereby generating a summed signal carrying combined audio content, channel-specific control data, segment-specific summation data, and spectral features vector data, and wherein said analyzing at least one of said two separate signals occurs before said step of summing; and storing the summed signal carrying audio content and marking and summing control data on a storage device.

13. The method of claim 12 further comprising the steps of:

extracting the marking and summing data from the summed signal;

identifying an at least one channel-specific signal within the summed signal; and separating the at least one channel-specific signal from the summed signal;

thereby providing a channel-specific signal carrying channel-specific audio content for audio content analysis.

14. The method of claim 13 wherein the separation of the summed signal is performed in accordance with the traffic control data carried by the at least one signal.

15. The method of claim 13 wherein the separation of the summed signal is accomplished through selectively marking speech segments included in the at least one signal associated with different speakers.

16. The method of claim 12 further comprising the step of compressing the summed signal in order to transform the signal to a compressed format signal.

17. The method of claim 12 further comprising the step of decompressing the summed and compressed signal.

18. The method of claim 12 further comprising the step of obtaining the summed signal from the storage device in order to perform audio channel separation and channel-specific content analysis; and storing the results of the content analysis on a storage device to provide for data mining options for additional applications.

19. The method of claim 12 wherein the marking of the at least one audio channel is performed in accordance with the traffic control data carried by the at least one signal.

20. The method of claim 12 wherein generating marking data of the at least one audio channel is accomplished through selectively marking speech segments included in the at least one signal associated with different speakers.

21. The method of claim 12 wherein the embedding of the marking and summing control data in the summed signal is achieved via data hiding.

22. The method of claim 21 wherein data hiding is performed by pulse code modulation robbed-bit method.

23. The method of claim 22 wherein data hiding is performed by code excited linear prediction compression method.

24. The method of claim 12 further comprising the step of performing content analysis operations prior to marking and prior to summing the at least two separate signals.

25. The method of claim 12 further comprising the step of pre-processing for extracting at least one speech feature vector from at least one of the at least two separate signals.

26. The method of claim 12 further comprising the step of marking in at least one of the at least two separate signals, a beginning point or an end point of speech by one speaker.

27. A computer readable storage medium containing a set of instructions for a general purpose computer, the set of instructions comprising:

analyzing at least one of at least two signals carrying audio content and traffic control data delivered via at least two audio channels, to generate channel-specific control data, and signal-specific spectral characteristics;

generating channel-specific marking control data from the channel-specific control data and the signal-specific spectral characteristics;

summing the at least two separate signals carrying audio content into a summed signal and generating summation control data; and embedding the channel-specific control data, the summation control data, and the signal-specific spectral characteristics into the summed signal;

wherein said analyzing said at least one of at least two signals occurs before said step of summing, thereby generating a summed signal carrying combined audio content, channel-specific control data, segment-specific summation data, and spectral features vector data; and storing the summed signal carrying audio content and marking and summing control data on a storage device.

28. An apparatus for the analysis, marking, summing and separating of at least two separate time-synchronized audio channels delivering at least two separate signals carrying encoded audio content, and control data, the apparatus comprising:

an audio channel marking component to extract from at least one of the at least two separate time-synchronized audio channels, signal-specific characteristics and channel-specific control information, and to generate from the extracted control information and signal characteristics channel-specific marking data;

an audio summing component to sum the at least two separate signals into a summed signal, and to generate signal summing control information;

a marking and summing embedding component to insert the generated marking data and summing control information into the summed signal;

a compression component for compressing the summed audio signal including the embedded marking and summing information in order to generate a compressed signal;

a decompression component for decompressing the compressed signal in order to generate a decompressed summed signal;

an embedded marking and summing control data extraction component to extract marking data and summing data and signal-specific characteristics and channel-specific control information from the decompressed summed signal; wherein said marking and summing embedding component embeds said control information by data hiding, an audio channel recognition component to identify at least one audio channel from the decompressed summed signal associated with the extracted marking and summing control data; and an audio channel separation component to separate the decompressed summed signal into the constituent separate time-synchronized channels thereof.

29. A method for the analysis, marking, summing and separating of at least two separate time-synchronized audio channels delivering at least two separate signals carrying encoded audio content, content and control data, the method comprising:

analyzing at least one of the at least two separate signals carrying audio content and traffic control data, to generate channel-specific control data, and signal-specific spectral characteristics;

generating channel-specific marking control data from the channel-specific control data and the signal-specific spectral characteristics;

summing the at least two separate signals carrying audio content into a summed signal and generating summation control data;

embedding the channel-specific control data, the summation control data, and the signal-specific spectral characteristics into the summed signal;

compressing the summed signal to obtain a summed compressed signal;

decompressing the summed compressed signal to obtain a decompressed summed signal;

extracting the marking and summing data from the decompressed summed signal;

identifying the channel-specific signal within the decompressed summed signal;

separating the channel-specific signal from the decompressed summed signal, wherein said analyzing said one of at least two separate signals occurs before said step of summing;

storing the summed signal carrying audio content and marking and summing control data on a storage device.

* * * * *